B. HABILD.
MACHINE FOR BEVELING THE EDGES OF LENSES OF EYEGLASSES.
APPLICATION FILED FEB. 13, 1912.

1,034,011.

Patented July 30, 1912.

3 SHEETS—SHEET 1.

B. HABILD.
MACHINE FOR BEVELING THE EDGES OF LENSES OF EYEGLASSES.
APPLICATION FILED FEB. 13, 1912.

1,034,011.

Patented July 30, 1912.

3 SHEETS—SHEET 3.

UNITED STATES PATENT OFFICE.

BRUNO HABILD, OF CHARLOTTENBURG, GERMANY, ASSIGNOR TO MARGARETE RIENOW, OF CHARLOTTENBURG, NEAR BERLIN, GERMANY.

MACHINE FOR BEVELING THE EDGES OF LENSES OF EYEGLASSES.

1,034,011. Specification of Letters Patent. Patented July 30, 1912.

Application filed February 13, 1912. Serial No. 677,340.

*To all whom it may concern:*

Be it known that I, BRUNO HABILD, a subject of the King of Prussia, and resident of 68 Krummestrasse, Charlottenburg, German Empire, have invented an Improved Machine for Beveling the Edges of Lenses of Eyeglasses and the Like, of which the following is a specification.

This invention relates to an improved machine for automatically beveling the edges of the lenses of eye-glasses and the like and the object of the present invention is to carry out the grinding work entirely automatically so that only the mounting and dismounting of the lenses in the machine requires to be performed by hand.

A further object of the present invention is to provide means whereby the completion of the grinding work may be readily observed by the operator.

According to the present invention the lens is mounted in the usual manner on a rotatable spindle which is supported by means of head stocks mounted upon a carriage which is capable of adjustment in such a manner that the lens is first brought to bear against one of the grinding surfaces of a rotatable grinding disk, having two grinding surfaces arranged at an angle to each other. After the lens has been sufficiently ground by the one surface of the grinding disk, the carriage supporting the lens is adjusted so as to move the lens toward the second grinding surface of the disk and maintain it in contact therewith, whereupon the beveled edge is completed in the second grinding operation.

The carriage is provided with a disengaging device whereby the driving gear for the rotatable spindle of the lens and for the adjustment of the carriage is thrown out of gear immediately the two beveled faces or facets have been ground.

The machine is preferably duplicated, that is to say, a lens is mounted on each side of the grinding disk together with an adjustable carriage therefor so that by this means the machine may be maintained in constant operation.

In order that the invention may be more clearly understood, reference is made to the accompanying drawings which show by way of example one method of carrying out my invention.

Figure 1:
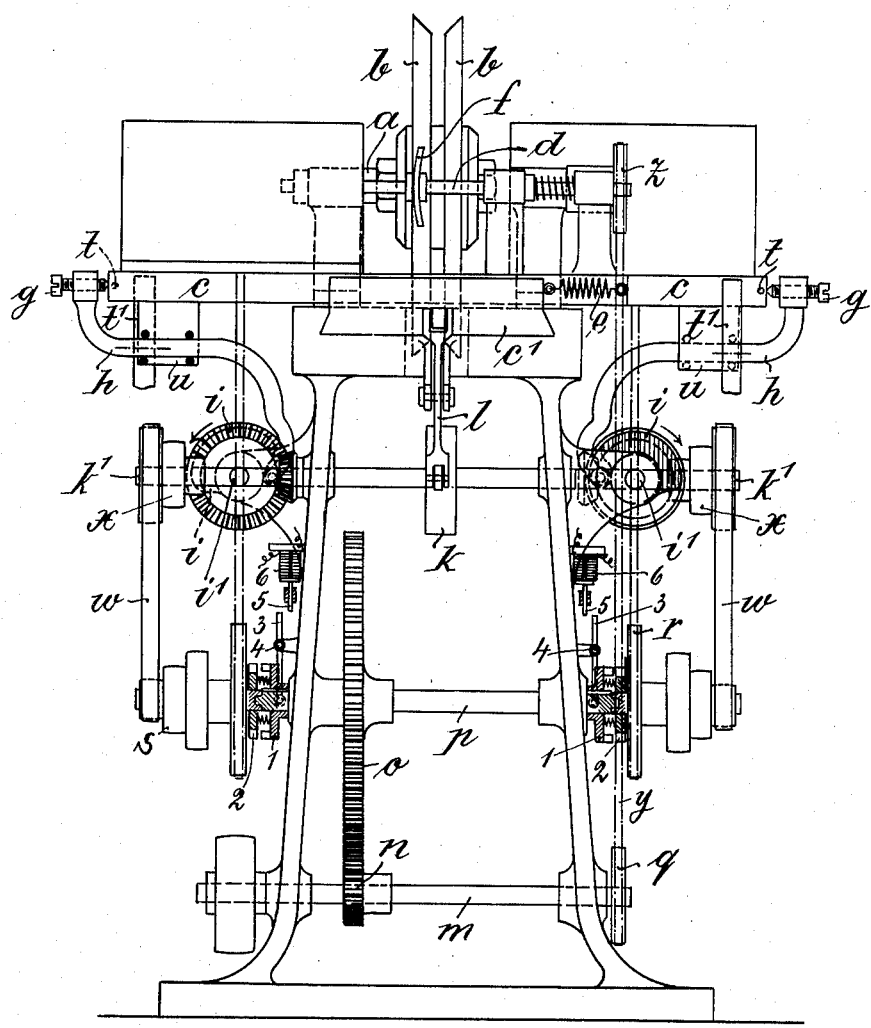
Figure 2:
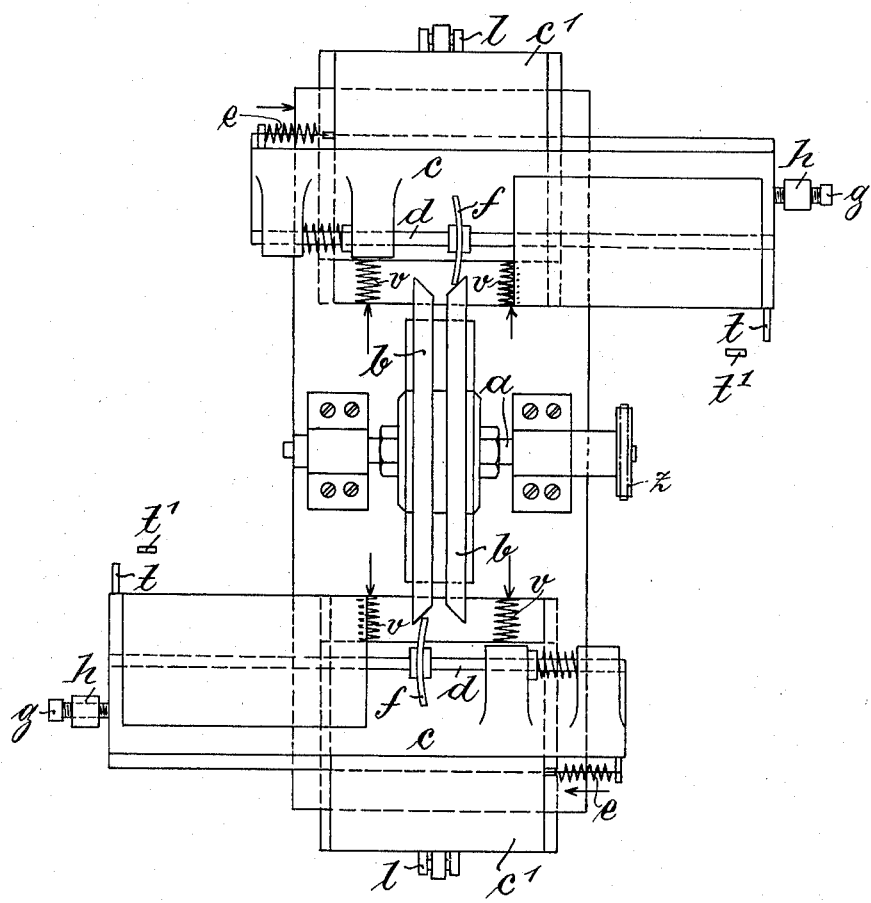
Figure 3:
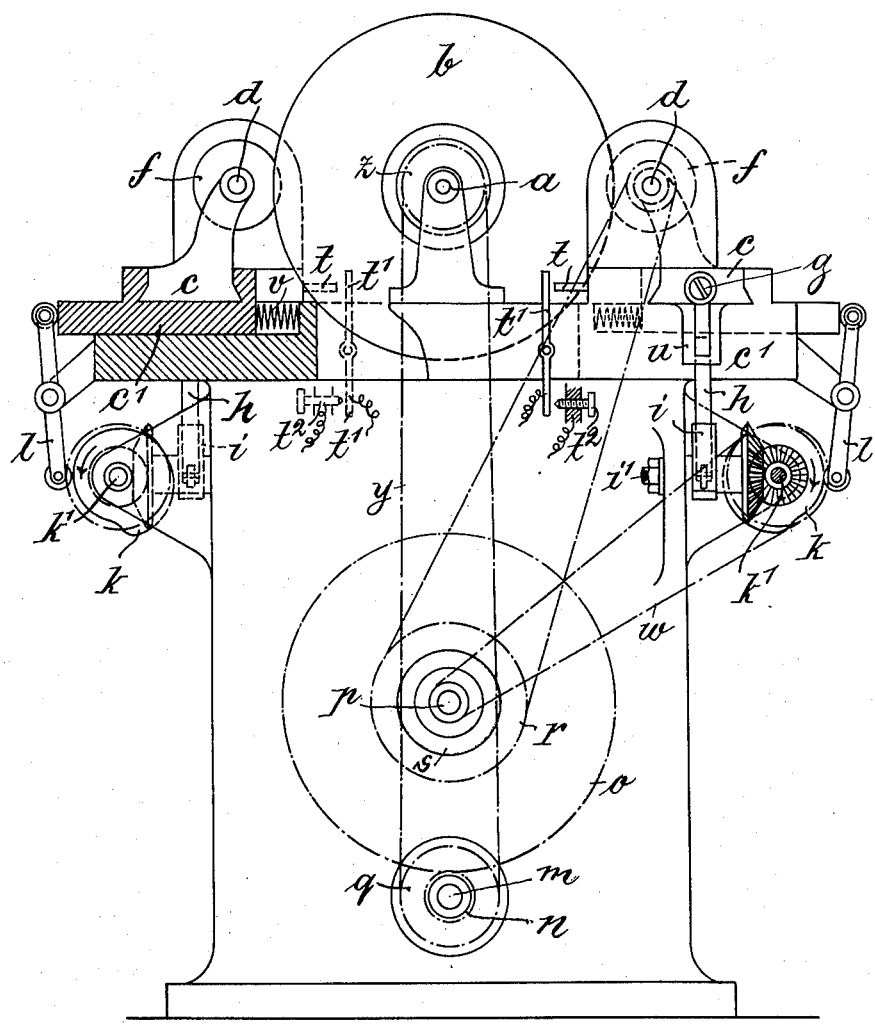

Figure 1 is a side view of the machine partly in section. Fig. 2 is a more or less diagrammatic plan view of Fig. 1. Fig. 3 is a side view of the machine partly in section.

$a$ designates the shaft of the grinding element $b$ which comprises two grinding disks mounted side by side upon the shaft $a$ and whose peripheral surfaces are adapted to make an angle of about 45° to one another. In front of and behind the grinding element $b$ carriages $c$ are mounted, one on each side of the grinding element, each carriage $c$ having bearings adapted to receive one of two rotatable spindles $d$ on which the lenses $f$ are adapted to be mounted in the usual manner.

On the drawings I have indicated circular lenses $f$ but it will of course be readily understood, that the machine may be equally well adapted for beveling the edges of oval lenses by providing mechanism of the well known type hitherto used for this purpose for imparting an elliptical or oval movement to the spindles $d$. In the example illustrated in the drawings the spindle $d$ is directly driven, but in the case of oval lenses, the spindle $d$ must be given an elliptical or oval movement by any suitable mechanism which may be mounted on the carriage $c$.

The carriage $c$ carrying the spindle $d$ and lens $f$ is adapted to be adjusted in the axial direction of the spindle $d$ within a slide $c'$ which is capable of adjustment in a direction at right angles to the adjustment of the carriage $c$ so that the lens $f$ may be adjusted across the surface of the grinding disks $b$ and moved up to or away from the same. For this purpose the carriage $c$ is normally held against an arm $h$ by means of a tension spring $e$, connected at one end to the slide $c'$ and at its other end to a pin projecting from the end of the carriage $c$. The arm $h$ which is preferably provided with an adjustment screw $g$ for adjusting the initial position of the carriage $c$, is slidably mounted in a lug $u$ depending from the carriage $c$, the lower end of the arm $h$ being provided with a roller adapted to bear against the surface of a cam $i$ mounted upon a cam shaft $i'$ driven by means of bevel gearing from a transverse shaft $k'$ so that the cam $i$ is adapted to move the arm $h$ and carriage $c$ against the action of the spring $e$ in the axial direction of the spindle $d$. The shaft $k'$ also carries a cam $k$ which bears against a roller carried on the lower end of a pivoted lever $l$, pivoted on an arm carried by the frame of the machine and whose upper end carries a roller adapted to bear against the end of the slide $c$ which is held in contact with the lever $l$ by means of a compression spring $v$ so that the cam $k$ moves the slide $c'$ against the action of the spring $v$ and consequently moves the lens $f$ toward the grinding disks $b$.

The machine is adapted to be driven from any suitable source of power, the drive being transmitted to the transverse shaft $m$ and through gear wheels $n$ and $o$ to a transverse shaft $p$ which carries at each end chain wheels $r$ and change speed pulleys $s$ which are preferably made integral with one another on each side of the machine and any suitable type of coupling being preferably inserted between the chain wheels $r$ and speed pulleys $s$ and the shaft $p$. The spindle $d$ carrying the lens is adapted to be driven from the chain wheel $r$ through any suitable mechanism, while the speed pulleys $s$ are adapted to drive the transverse shaft $k$ by means of belts $w$ and change speed pulleys $x$.

The spindle $a$ of the grinding disks $b$ is adapted to be driven from the main transmission shaft $m$ through a chain wheel $q$ chain $y$ and chain wheel $z$.

The coupling between the chain wheel $r$ and the shaft $p$ is shown by way of example, on the drawings as being of the claw clutch type, the movable claw member $l$, which is adapted against the action of springs, to engage the notched member 2, being slidable on the shaft $p$ and having a lever 3 pivoted thereto, the lever 3 being pivoted also at 4 and its free end being retained when the members 1 and 2 are in engagement, by an armature 5 of an electromagnet 6 so that the coupling is adapted to be electrically thrown out of gear, each carriage $c$ being provided with a projection $t$ adapted to contact with a pivoted lever $t'$ when the lens has been completely ground, whereupon the pivoted lever $t'$ contacts with an electrical contact $t^2$ to close an electrical circuit and energize the electromagnet 6 and throw the coupling between the chain wheel $r$ and speed pulleys $s$ and the shaft $p$ out of gear by releasing the lever 3. The carriage $c$ and slide $c'$ may also, if desired, be provided with any suitable disengaging device, adapted to be manipulated to withdraw the lens at any time when required from contact with the grinding disks $b$.

The operation of the foregoing machine is as follows: The lens $f$ is mounted on the spindle $d$ and the carriage $c$ and slide $c'$ adjusted, until the lens is in the position illustrated in Fig. 2. The machine is then set in operation, the lens $f$ being maintained in contact with the grinding disk $b$ during the grinding operation through the medium of the cam $k$ and pivoted lever $l$. The cam $k$ is of such a form that the forward feed of the slide $c'$ takes place during $\frac{3}{4}$ of the rotation of the cam $k$ whereupon the lever $l$ is freed and the slide $c'$ returns to its normal position by the action of the spring $v$. During this forward movement of the slide $c'$, a facet is ground on the edge of the lens $f$, the carriage $c$ remaining stationary during this operation in as much as the roller on the arm $h$ bears against a part of the cam $i$ whose surface is of smallest radius and concentric with the shaft $i'$, the shaft $i'$ being geared up to the shaft $k'$ in such a manner that the cam $i$ makes $\frac{3}{8}$ of a revolution during $\frac{3}{4}$ of a revolution of the cam $k$. On the completion of this movement, the cam $i$ moves the arm $h$ and carriage $c$ so as to move the lens $f$ from one of the grinding surfaces to the other of the grinding disks $b$, this movement taking place immediately the slide $c'$ has been returned by the spring $v$. After the axial movement is completed, the lens $f$ is then brought to bear against the other grinding disk by the action of the cam $k$ and lever $l$ and the grinding of the second facet thereupon completed by the second grinding disk $b$. Immediately this is effected, the projection $t$ on the carriage $c$ contacts with the pivoted lever $t'$ and the coupling for the driving mechanism is thrown out of gear in the manner hereinbefore referred to. The finished lens can then be removed and replaced by another lens while the grinding operation on the other spindle $d$ may be continued.

I claim:—

1. A machine for beveling the edges of lenses comprising a rotatable grinding element having two peripheral surfaces at an acute angle to each other, a rotatable spindle for carrying the lens, a carriage on which said spindle is mounted and mechanism for automatically and positively moving said carriage so as to automatically feed the lens forwardly against the one peripheral surface of said grinding element, thereafter automatically withdraw said lens and move it across the grinding element to the other peripheral surface thereof and thereafter automatically feed the lens forwardly against the last mentioned surface.

2. A machine for beveling the edges of lenses comprising a rotatable grinding element having two peripheral surfaces at an acute angle to each other, a rotatable spindle for carrying the lens, a carriage on which said spindle is mounted, mechanism for automatically and positively moving said carriage so as to automatically feed the lens forwardly against the one peripheral surface of said grinding element, thereafter automatically withdraw said lens and move it across the grinding element, to the other peripheral surface thereof and thereafter automatically feed the lens forwardly against the last mentioned surface, and means for thereupon automatically throwing said mechanism out of gear.

3. A machine for beveling the edges of lenses comprising a rotatable grinding element having two peripheral surfaces at an acute angle to each other, a rotatable spindle for carrying the lens, means for driving said spindle, a carriage on which said spindle is mounted, mechanism for automatically and positively moving said carriage so as to automatically feed the lens forwardly against the one peripheral surface of said grinding element, thereafter automatically withdraw said lens and move it across the grinding element to the other peripheral surface thereof and thereafter automatically feed the lens forwardly against the last mentioned surface, and means for thereupon automatically throwing said spindle driving means and carirage moving mechanism out of gear.

4. A machine for beveling the edges of lenses comprising a rotatable grinding element having two peripheral surfaces at an acute angle to each other, a rotatable spindle for carrying the lens, a carriage on which said spindle is mounted, a slide in which said carriage is slidably movable, a guideway in which said slide may move, mechanism for automatically and positively moving said carriage in said slide and mechanism for automatically and positively moving said slide in said guideway, so as to automatically feed the lens forwardly against the one peripheral surface of said grinding element, thereafter automatically withdraw said lens and move it across the grinding element to the other peripheral surface thereof and thereafter automatically feed the lens forwardly against the last mentioned surface.

5. A machine for beveling the edges of lenses comprising a rotatable grinding element having two peripheral surfaces at an angle to each other, a rotatable spindle for carrying the lens, a carriage on which said spindle is mounted, a slide in which said carriage is slidably movable, a guideway in which said slide may move, a main driving shaft, mechanism for rotating said grinding element and spindle from said shaft, a cam shaft, mechanism for rotating said cam shaft from said main shaft, a clutch intermediate said main shaft and the mechanisms for rotating said spindle and cam shaft, a cam on said cam shaft, a wiper engaging said cam and adapted to move said slide in said guideway, a second cam, a second wiper therefor adapted to slide said carriage in said slide and springs tending to counteract the movements of said wipers.

6. A machine for beveling the edges of lenses comprising a rotatable grinding element having two peripheral surfaces at an acute angle to each other, rotatable spindles in front of and behind said element, for carrying the lenses, carriages on each of which one of said spindles is mounted, and mechanism for automatically and positively moving said carriages so as to automatically feed the lenses toward the one peripheral surface of said element, thereafter automatically withdraw said lenses and move the same across said element to the other peripheral surface thereof and thereafter automatically feed said lenses toward the last mentioned surface.

7. A machine for beveling the edges of lenses comprising a rotatable grinding element having two peripheral surfaces at an acute angle to each other, rotatable spindles in front of and behind said element, for carrying the lenses, carriages on each of which one of said spindles is mounted, mechanism for automatically and positively moving said carriages so as to automatically feed the lenses toward the one peripheral surface of said element, thereafter automatically withdraw said lenses and move the same across said element to the other peripheral surface thereof and thereafter automatically feed said lenses toward the last mentioned surface, and mechanism for thereupon automatically throwing the mechanism for moving said carriages independently out of gear.

In witness whereof I have hereunto set my hand in the presence of two witnesses.

BRUNO HABILD.

Witnesses:
WOLDEMAR HAUPT,
HENRY HASPER.